(12) United States Patent
Narukawa (10) Patent No.: US 10,591,077 B2
(45) Date of Patent: Mar. 17, 2020

(54) CONTROL VALVE AND METHOD OF MANUFACTURING THE SAME

(71) Applicant: FUJIKOKI CORPORATION, Tokyo (JP)

(72) Inventor: Bunta Narukawa, Tokyo (JP)

(73) Assignee: FUJIKOKI CORPORATION, Tokyo (JP)

(*) Notice: Subject to any disclaimer, the term of this patent is extended or adjusted under 35 U.S.C. 154(b) by 0 days.

(21) Appl. No.: 15/945,781

(22) Filed: Apr. 5, 2018

(65) Prior Publication Data

US 2018/0299021 A1    Oct. 18, 2018

(30) Foreign Application Priority Data

Apr. 18, 2017 (JP) .................... 2017-082142

(51) Int. Cl.
| | |
|---|---|
| F16K 27/10 | (2006.01) |
| F16K 27/02 | (2006.01) |
| F16K 1/48 | (2006.01) |
| F16K 31/04 | (2006.01) |
| F25B 41/06 | (2006.01) |

(52) U.S. Cl.
CPC .............. *F16K 27/029* (2013.01); *F16K 1/48* (2013.01); *F16K 27/10* (2013.01); *F16K 31/04* (2013.01); *F16K 31/041* (2013.01); *F25B 41/062* (2013.01); *F25B 2341/065* (2013.01); *Y02B 30/72* (2013.01)

(58) Field of Classification Search
CPC ...... F16K 31/04; F16K 31/041; F16K 27/029; F16K 27/10; F16K 1/48; F25B 41/062; F25B 2341/065; Y02B 30/72

USPC ..................................... 251/129.12
See application file for complete search history.

(56) References Cited

U.S. PATENT DOCUMENTS

| | | |
|---|---|---|
| 3,895,331 A | 7/1975 | Saarem |
| 4,411,406 A | 10/1983 | Inada et al. |
| 5,520,213 A | 5/1996 | Muller |
| 6,247,766 B1 * | 6/2001 | Subramanian ............ B60T 7/12 |
| | | 303/119.2 |
| 6,254,059 B1 | 7/2001 | Kurosawa et al. |

(Continued)

FOREIGN PATENT DOCUMENTS

| | | |
|---|---|---|
| DE | 296 10 850 U1 | 10/1996 |
| EP | 0 589 258 A1 | 3/1994 |

(Continued)

OTHER PUBLICATIONS

European Search Report in corresponding European Application No. 18167471.4 dated Aug. 21, 2018.

(Continued)

*Primary Examiner* — Matthew W Jellett
(74) *Attorney, Agent, or Firm* — Bacon & Thomas, PLLC (57) ABSTRACT

The invention provides a control valve which makes the downsizing and the weight reduction possible and a method of manufacturing the same. The control valve is provided with a valve main body in which a valve chamber is formed in its inner portion, a connection member which is firmly fixed to the valve main body, and a can which is firmly fixed to the valve main body. The valve main body and the can include the same metal material. The connection member is made of a resin. The connection member is provided with a fastening portion for connecting piping parts.

4 Claims, 5 Drawing Sheets

(56) References Cited

U.S. PATENT DOCUMENTS

| | | | |
|---|---|---|---|
| 6,691,979 B2 * | 2/2004 | Parsons | E03D 3/02 251/129.04 |
| 2013/0032740 A1 | 2/2013 | Ro | |
| 2014/0291562 A1 | 10/2014 | Ooe et al. | |

FOREIGN PATENT DOCUMENTS

| | | | |
|---|---|---|---|
| EP | 0 663 992 A1 | | 7/1995 |
| EP | 2 236 801 A1 | | 10/2010 |
| JP | H08-216668 A | | 8/1996 |
| JP | 2003-172470 A | | 6/2003 |
| JP | 2003172470 A | * | 6/2003 |
| JP | 2012-172689 A | | 9/2012 |
| JP | 2014-196810 A | | 10/2014 |

OTHER PUBLICATIONS

Office Action dated Oct. 22, 2019 in corresponding European application No. 18 167 471.4-1015.

* cited by examiner

CONTROL VALVE AND METHOD OF MANUFACTURING THE SAME

TECHNICAL FIELD

The present invention relates to a control valve and a method of manufacturing the same.

BACKGROUND ART

For example, in a control valve such as a flow control valve which is arranged in a circulating flow path of a refrigerant in an air conditioning equipment, it has been known that the control valve is assembled by connecting a valve main body including a valve chamber and a can accommodating a valve drive portion.

As a relevant technique, patent literature 1 discloses a stepping motor driven type control valve. In the control valve described in the patent literature 1, a flange is provided in a lower end of the can. Further, the flange is pinched between a ring screw and a valve main body, so that the can is fixed to the valve main body.

Patent literature 2 discloses a method of manufacturing a valve housing for a control valve. In the manufacturing method described in the patent literature 2, a mold main body portion is formed by integrally molding a periphery of a valve casing unit made of a metal with a molding material. Further, in the manufacturing method described in the patent literature 2, a lid member is firmly fixed to a lower end of a plunger case. Further, when the plunger case is fixed to the mold main body portion, the lid member in the lower end of the plunger case is firmly fixed to the mold main body portion by caulking an end portion of the valve casing unit made of the metal.

CITATION LIST

Patent Literature

PATENT LITERATURE 1: Japanese Unexamined Patent Application Publication No. 2014-196810
PATENT LITERATURE 2: Japanese Patent No. 5465686

SUMMARY OF THE INVENTION

Technical Problem

In the control valve described in the patent literature 1 and the patent literature 2, there are a lot of dedicated parts for connecting the units which construct the control valve. In other words, in the control valve described in the patent literature 1 and the patent literature 2, a connection structure between the units does not respond to a downsizing and a weight reduction of the control valve.

Accordingly, an object of the present invention is to provide a control valve which makes the downsizing and the weight reduction possible and a method of manufacturing the same.

Solution to Problem

In order to achieve the object mentioned above, a control valve according to the present invention is provided with a valve main body in which a valve chamber is formed in its inner portion, a connection member which is firmly fixed to the valve main body, and a can which is firmly fixed to the valve main body. The valve main body and the can include the same metal material. The connection member is made of a resin. The connection member is provided with a fastening portion for connecting piping parts.

In the control valve mentioned above, the valve main body may be made of a stainless steel. Further, the can may be made of a stainless steel.

In the control valve mentioned above, the valve main body and the can may be firmly fixed by welding.

In the control valve mentioned above, the valve main body and the connection member may be integrated according to an insert molding.

In the control valve mentioned above, the valve main body may have a first piping which is provided with a first flange portion. Further, the connection member may have a first flange receiving portion which is arranged in the periphery of the first piping.

In the control valve mentioned above, the number of the fastening portion may be set to one.

The control valve mentioned above may be provided with a rotor member which is arranged within the can, and a stator member which is arranged outside the can.

A method of manufacturing a control valve according to the present invention is provided with a step of preparing a valve side unit which includes a valve main body made of a metal, and a connection member made of a resin, and a step of firmly fixing the valve main body made of the metal, and the can made of the metal. The connection member is provided with a fastening portion for connecting piping parts.

Effect of the Invention

According to the present invention, it is possible to provide a control valve which makes a downsizing and a weight reduction possible and a method of manufacturing the same.

DESCRIPTION OF EMBODIMENTS

A description will be given below of a control valve and a method of manufacturing the same according to an embodiment with reference to the accompanying drawings. In the following description of the embodiment, the same reference numerals are attached to positions and members having the same functions, and a redundant description of the positions and the members to which the same reference numerals are attached will be omitted. A description will be given of an example in which a control valve 1 is an electrically operated valve, however, the control valve may be an electromagnetic valve.

Embodiment

Figure 1:
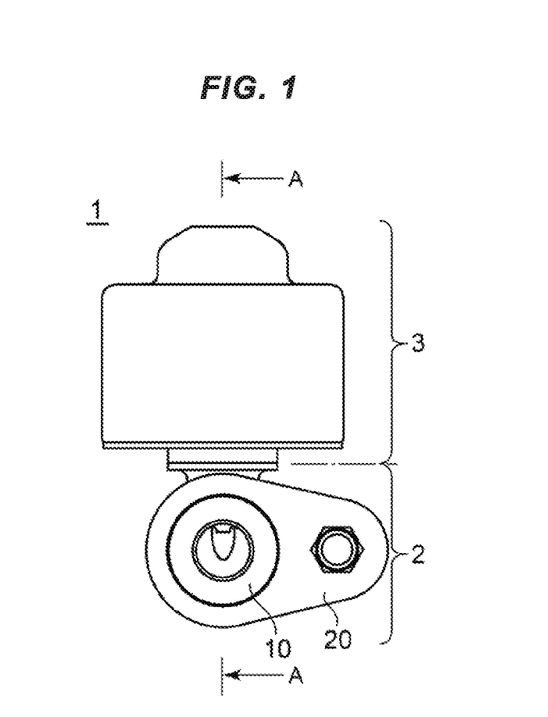
FIG. 1 is a schematic side elevational view of a control valve 1 according to an embodiment.
Figure 2:
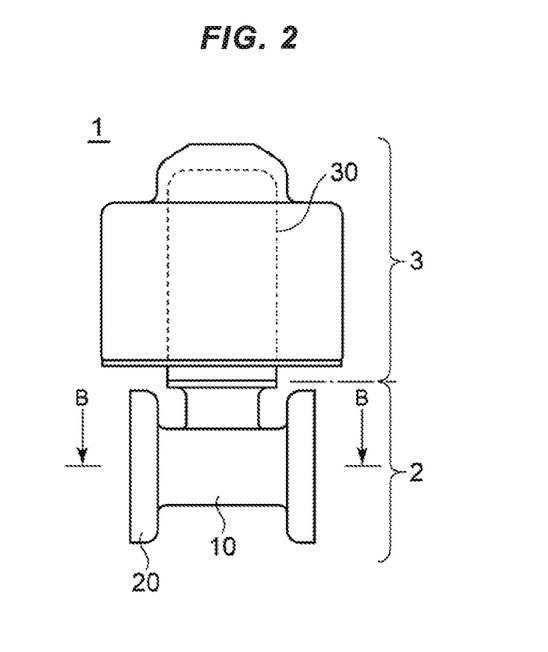
FIG. 2 is a schematic front elevational view of the control valve 1 according to the embodiment.
Figure 3:
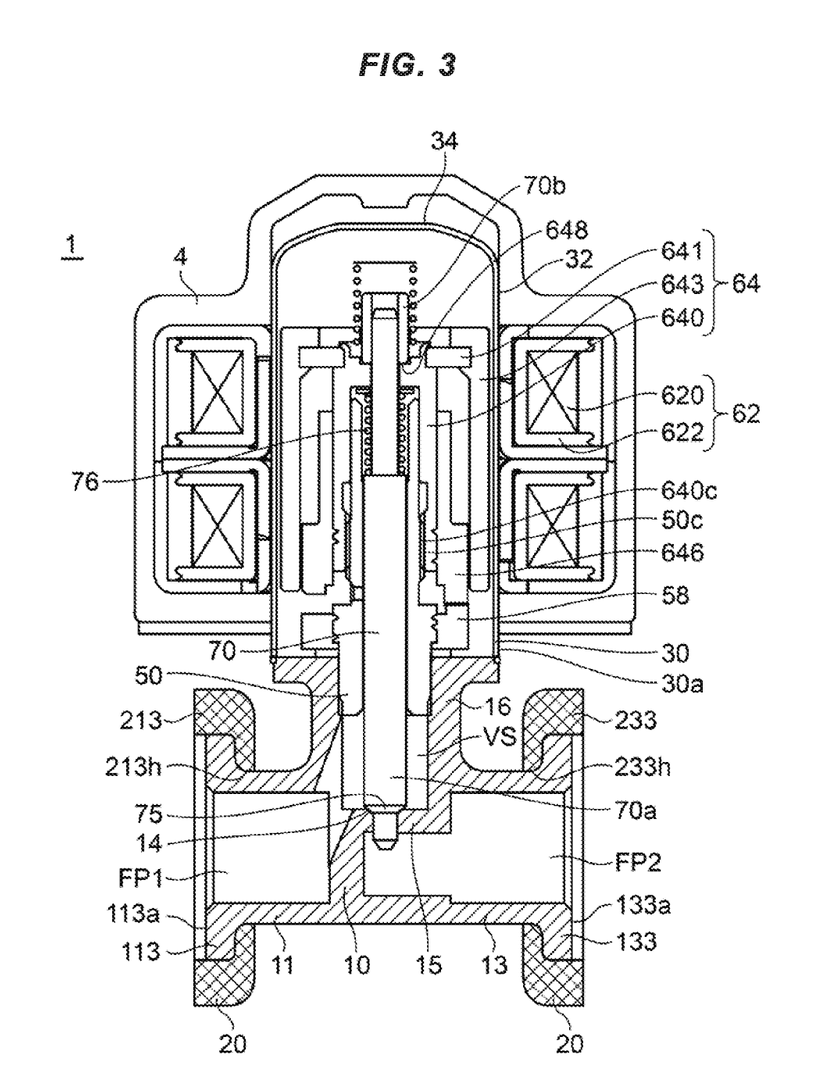
FIG. 3 is a cross sectional view as seen from an arrow A-A in FIG. 1.
Figure 4:
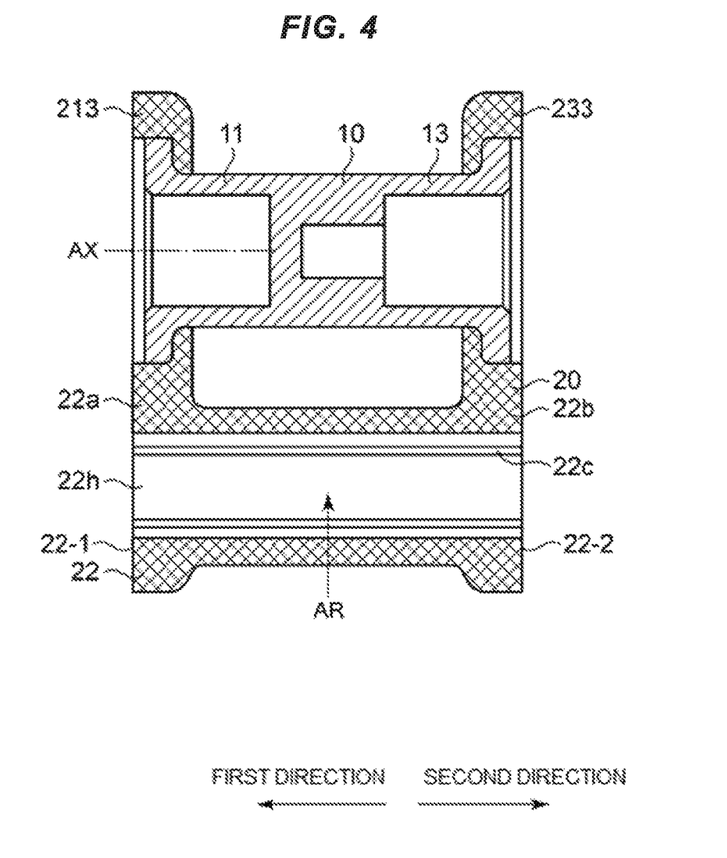
FIG. 4 is a cross sectional view as seen from an arrow B-B in FIG. 2.

A description will be given of a control valve 1 according to an embodiment with reference to FIGS. 1 to 4. FIG. 1 is a schematic side elevational view of a control valve 1 according to the embodiment. FIG. 2 is a schematic front elevational view of the control valve 1 according to the embodiment. FIG. 3 is a cross sectional view as seen from an arrow A-A in FIG. 1. FIG. 4 is a cross sectional view as seen from an arrow B-B in FIG. 1.

With reference to FIGS. 1 and 2, the control valve 1 is provided with a valve side unit 2 which defines a flow path and a valve chamber, and a drive unit 3 which drives a valve body. A valve main body 10 and a connection member 20 are included in the valve side unit 2, and a can 30 is included in the drive unit 3.

With reference to FIG. 3, the control valve 1 according to the embodiment is provided with the valve main body 10 in which a valve chamber VS is formed in its inner portion, the connection member 20 which is firmly fixed to the valve main body 10, and the can 30 which is firmly fixed to the valve main body 10.

The valve main body 10 is made of the metal. As a result, a strength of the valve main body 10 is high, and there is a small risk that a liquid leaks from the valve main body 10.

The can 30 is made of the metal. The valve main body 10 and the can 30 include the same metal material. More specifically, a main material (that is, an element having the highest content ratio) of the valve main body 10 coincides with a main material (that is, an element having the highest content ratio) of the can 30. As a result, it is easy to directly fix the can 30 to the valve main body 10. For example, the valve main body 10 and the can 30 can be firmly fixed by welding. In an example described in FIG. 3, the valve main body 10 and a lower end portion 30*a* of the can are firmly fixed by welding. Since the main material of the valve main body 10 is the same as the main material of the can 30, an electric corrosion risk can be reduced. The material of the valve main body 10 and the material of the can 30 may be completely the same.

The valve main body 10 is made of the stainless steel, for example, SUS304, and the can 30 is made of the stainless steel such as SUS304. Since the valve main body 10 and the can 30 are made of the stainless steel, a corrosion risk of the valve main body 10 and the can 30 can be reduced.

In the example described in FIG. 3, the valve main body 10 and the can 30 are firmly fixed to each other without interposition of a seal member such as an O-ring. As a result, a parts number can be reduced. Further, in the case that the valve main body 10 and the can 30 are firmly fixed by welding, the risk of the liquid leak is lower in comparison with the case that the valve main body 10 and the can 30 are firmly fixed by a caulking work.

As shown in FIG. 4, the connection member 20 is provided with a fastening portion 22 for connecting the piping parts (for example, a first connection pipe 811 and a second connection pipe 831 mentioned later, or block parts having connection pipes). In an example described in FIG. 4, the fastening portion 22 includes a hole portion 22*h* (a hole portion for fastening) which receives a fastening member such as a screw or a bolt. The hole portion 22*h* may include a through hole, or may include a non-through hole.

The connection member 20 is made of a resin. As a result, a weight of the connection member 20 can be reduced. The resin constructing the connection member 20 is, for example, a poly phenylene sulfide resin (PPS resin).

The connection between the valve main body 10 made of the metal, and the connection member 20 made of the resin is preferably achieved by an insert molding. In other words, the valve main body 10 and the connection member 20 are preferably integrated by the insert molding. For example, a resin material is cast into a molding die after the valve main body 10 made of the metal is arranged within the molding die. On the basis of the solidification of the resin material, a compound component obtained by integrating the valve main body 10 and the connection member 20 made of the resin is insert molded. The insert molded compound component is provided with the valve main body 10, and the connection member 20 which is arranged in the periphery of a part of the valve main body 10.

In the case that the connection between the valve main body 10 made of the metal and the connection member 20 made of the resin is achieved by the insert molding, a dedicated fastening member connecting the valve main body 10 and the connection member 20 is not required. Further, in the example described in FIG. 3, the valve main body 10 and the connection member 20 are firmly fixed to each other without interposition of a seal member such as an O-ring. As a result, the number of parts of the control valve 1 is reduced, a weight of the control valve 1 is reduced, and the control valve 1 is downsized. In the case that the connection between the valve main body 10 made of the metal and the connection member 20 made of the resin is achieved by the insert molding, a risk of liquid leak from a portion between the valve main body 10 and the connection member 20 is small.

In the embodiment, the control valve 1 includes the valve side unit 2 having the valve main body 10 made of the metal and the connection member 20 made of the resin. The valve side unit 2 includes both the fastening portion 22 to which the piping parts mentioned later are fastened, and the vale chamber VS in which the fluid flows. Further, the parts and the man hour required for assembling the valve side unit 2 are reduced. On the basis of the reduction of the parts number, the weight of the control valve 1 is reduced, and the control valve 1 is downsized. Further, in the embodiment, it is easy to directly fix the can 30 to the valve main body 10 since the valve main body 10 and the can 30 include the same metal material. Further, in the embodiment, the weight of the control valve 1 is reduced since the connection member 20 is made of the resin.

Further, in the embodiment, in the case that the valve main body 10 and the can 30 are made of the stainless steel, the valve main body 10 and the can 30 are hard to be corroded.

Further, in the embodiment, in the case that the valve main body 10 and the can 30 are firmly fixed by welding, the connection structure between the valve main body 10 and the can 30 becomes firm, and the liquid leak is hard to be generated. Further, in the case that the valve main body 10 and the can 30 are firmly fixed by welding, the dedicated fastening member connecting between the valve main body 10 and the can 30, and the dedicated seal member are not required. As a result, the parts number of the control valve 1 is further reduced, the weight of the control valve 1 is reduced, and the control valve 1 is downsized.

In the case that the member made of the resin is connected to the valve main body 10, there is a risk that the member made of the resin melts when the valve main body 10 and the can 30 are welded. However, in the embodiment, there is no risk that the connection member 20 made of the resin melts when the valve main body 10 and the can 30 are welded, since the connection member 20 made of the resin is positioned away from the weld portion.

Further, in the embodiment, in the case that the valve main body 10 and the connection member 20 are integrated by the insert molding, the dedicated fastening member connection between the valve main body 10 and the connection member 20, and the dedicated seal member are not required. As a result, the parts number of the control valve 1 is further reduced, the weight of the control valve 1 is reduced and the control valve 1 is downsized.

More Detailed Description of Embodiment

A description will be given in more detail of each of the structures of the control valve 1 according to the embodiment with reference to FIGS. 1 to 4.
(Valve Main Body 10)
In the example described in FIG. 3, the valve main body 10 is provided with a first piping 11 which defines a first flow path FP1, a second piping 13 which defines a second flow path FP2, the valve chamber VS, and a valve seat 14. Further, the first flow path FP 1 is communicated with the valve chamber VS, and the valve chamber VS is communicated with the second flow path FP2. The valve seat 14 is provided in a wall surface of a partition wall 15 which comparts the valve chamber VS and the second flow path FP2.

The valve main body 10 may be provided with a first connection portion 16 to which a guide unit 50 guiding the movement of a valve shaft 70 is connected.

In the example described in FIG. 3, a first flange portion 113 is provided in an end portion of the first piping 11. Further, a second flange portion 133 is provided in an end portion of the second piping 13. The first flange portion 113 may be provided with a first receiving surface 113*a* which comes into contact with a first seal member 91 mentioned later, and the second flange portion 133 may be provided with a second receiving surface 133*a* which comes into contact with a second seal member 93 mentioned later.

In the example described in FIG. 3, the valve main body 10 is one metal member which is integrally formed, however, the valve main body 10 may be formed by connecting a plurality of metal parts which are prepared separately.

The valve main body 10 may be formed by applying a cutting work and a polishing work to a metal block which is formed by forging, press work or casting.
(Connection Member 20)
The connection member 20 is provided with a first flange receiving portion 213 which is arranged in the periphery of the first piping 11 (more specifically, the first flange portion 113). The first flange receiving portion 213 is provided with a hole portion 213*h* through which the first piping 11 passes.

Further, the connection member 20 is provided with a second flange receiving portion 233 which is arranged in the periphery of the second piping 13 (more specifically, the second flange portion 133). The second flange receiving portion 233 is provided with a hole portion 233*h* through which the second piping 13 passes.

In the example described in FIG. 4, the first flange receiving portion 213 and the second flange receiving portion 233 are connected via the fastening portion 22. Alternatively, the first flange receiving portion 213 and the second flange receiving portion 233 may be separated from each other.

In the example described in FIG. 4, the fastening portion 22 has a first fastening portion 22*a* in a first direction side (the first flange receiving portion 213 side), and a second fastening portion 22*b* in a second direction side (the second flange receiving portion 233 side). Further, the fastening portion 22 has a hole portion 22*h*, and the hole portion 22*h* has a female thread portion 22*c* which is threadably mounted to a male thread portion of a fastening member (a screw or a bolt). In the case that the fastening portion 22 and a piping part 80 mentioned later are connected by using a bolt and a nut, the hole portion 22*h* may be a no-thread hole portion. In the example described in FIG. 4, the hole portion 22*h* is one hole portion which reaches a second end surface 22-2 of the fastening portion 22 from a first end surface 22-1 of the fastening portion 22, however, may be separated into two sections by a center portion. In other words, the partition wall may be arranged in a position shown by an arrow AR.

In the example described in FIG. 4, the connection member 20 is provided with only one fastening portion 22 at an eccentric position of a central axis AX of the first piping 11. As a result, the parts number of the control valve 1 is reduced in comparison with the case that two or more fastening portions 22 are provided. Further, in the case of only one fastening portion 22, it is easy to regulate a positional relationship between the fastening portion 22, and the first piping 11 and the second piping 13, and a degree of freedom in design of the control valve 1 is improved. However, in the embodiment, the number of the fastening portion 22 is not limited to one, but the number of the fastening portion 22 may be equal to or more than two. In the present specification, the fastening portions which are identical in both of the distance of the first piping 11 from the central axis AX and the direction from the central axis AX are counted as the same fastening portion, with regard to the number of the fastening portion 22. As a result, in the example described in FIG. 4, one fastening portion 22 is constructed by the first fastening portion 22*a* and the second fastening portion 22*b*/
(Can 30)
In the example described in FIG. 3, the can 30 is provided with a cylindrical side wall 32, and an end wall 34. The end wall 34 has a dome shape which is convex to an upper side. Further, the side wall 32 extends toward a downward direction from an outer peripheral portion of the end wall 34. A lower end portion 30*a* of the side wall 32 is formed into an annular shape, and the annular lower end portion 30*a* and the valve main body 10 are welded to each other.
(Rotor Member 64 and Stator Member 62)
In the example described in FIG. 3, the control valve 1 is provided with a rotor member 64 which is arranged within the can 30, and a stator member 62 which is arranged outside the can 30.

The stator member 62 includes a bobbin 622, and a coil 620 which is wound to the bobbin. A pulse signal is input to the coil 620 from an electric wire which is connected to an electric power supply. Further, when the pulse signal is input to the coil 620, the rotor member 64 turns only at an angle of rotation which corresponds to a pulse number of the pulse signal. More specifically, in the example described in FIG. 3, a stepping motor is constructed by the stator member 62 and the rotor member 64.

In the example described in FIG. 3, the stator member 62 is attached to the side wall 32 of the can 30. In addition, the stator member 62 is accommodated within the housing 4 made of the resin.

The rotor member 64 is arranged in an inner side of the side wall 32 of the can 30 so as to be rotatable in relation to the can 30. At least a part of the rotor member 64 is formed by a magnetic material, and the rotor member 64 is provided with a magnet.

A description will be in more detail given of an example of the rotor member 64. The rotor member 64 has an outer tube 641 which includes the magnet, and an inner tube 640 which includes a first thread portion 640c. The magnet included in the outer tube 641 is, for example, a plastic magnet.

The material of the inner tube 640 is, for example, the metal. The first thread portion 640c of the inner tube 640 is a female thread portion. The first thread portion 640c is threadably mounted to a second thread portion 50c (a male thread portion) of the guide unit 50.

In the example described in FIG. 3, the rotor member 64 includes a connection member 643. Further, an upper end portion of the outer tube 641 and an upper end portion of the inner tube 640 are connected via the connection member 643. The connection member 643 has, for example, a ring shape. The material of the connection member 643 is, for example, the metal such as brass. The connection member 643 and the outer tube 641 (the plastic magnet) may be integrally formed by the insert molding. The connection member 643 and the inner tube 640 may be firmly fixed by a caulking work.

In the example described in FIG. 3, the rotor member 64 includes a positioning member 646. The positioning member 646 defines a lower limit position of movement of the rotor member 64. Specifically, when the rotor member 64 moves in the downward direction while turning, the positioning member 64 comes into contact with the stopper 58. A position where the positioning member 64 comes into contact with the stopper 58 is the lower limit position of movement of the rotor member 64.

The stopper 58 may be provided in any given member which does not turn together with the rotor member 64. In the example described in FIG. 3, the stopper 58 is provided in the guide unit 50. Alternatively, the stopper 58 may be provided in the can 30.

In the example described in FIG. 3, the rotor member 64 and the guide unit 50 are threadably mounted via the first thread portion 640c and the second thread portion 50c. As a result, the rotor member 64 vertically moves as well as turning. Alternatively, the rotor member 64 may be a rotor member which does not vertically move.

(Valve Drive Portion)

A valve drive portion is a mechanism which moves up and down a valve body 75 via the valve shaft 70 on the basis of the rotation of the rotor member 64, and is accommodated in the can 30. The valve shaft 70 is a rod-shaped member which supports the valve body 75. The valve body 75 is arranged in a first end portion 70a of the valve shaft 70. Further, the valve body 75 seats on the valve seat 14 on the basis of the movement of the valve shaft 70 in the downward direction, and the valve body 75 moves away from the valve seat 14 on the basis of the movement of the valve shaft 70 in the upward direction.

In the example described in FIG. 3, a second end portion 70b of the valve shaft 70 is supported by the rotor member 64. In the example described in FIG. 3, a lower surface of the second end portion 70b of the valve shaft 70 is supported by an upper surface of the rotor member 64 (more specifically, an upper surface of the inner tube 640).

In the example described in FIG. 3, the second end portion 70b of the valve shaft 70 is supported by a valve shaft support portion 648 (for example, a concave portion) of the rotor member 64. The valve shaft 70 is biased in the downward direction by the biasing member 76. As a result, in a state in which the valve body 75 is away from the valve seat 14, the second end portion 70b of the valve shaft 70 is in contact with the valve shaft support portion 648 of the rotor member 64. As a result, the valve shaft 70 vertically moves together with the rotor member 64. Further, the second end portion 70b of the valve shaft 70 and the valve shaft support portion 648 are brought into pressure contact with each other on the basis of the biasing force caused by the biasing member 76. As a result, the valve shaft 70 turns together with the rotor member 64 in a state in which the valve body 75 is away from the valve seat 14.

When the rotor member 64 further moves in the downward direction while turning after the valve body 75 comes into contact with the valve seat 14, the biasing member 76 contracts and the valve body 75 is pressed against the valve seat 14. Further, the valve shaft 70 (and the valve body 75) stop rotating on the basis of the friction force between the valve body 75 and the valve seat 14.

In the example described in FIG. 3, the movement (the vertical movement and the turning movement around the central axis) of the valve shaft 70 is guided by the inner peripheral surface of the guide unit 50. In other words, a gap between an outer peripheral surface of the valve shaft 70 and an inner peripheral surface of the guide unit 50 is a small gap. Further, in the example described in FIG. 3, the thread portion threadably mounted to the other member is not provided in the outer surface of the valve shaft 70.

In the example described in FIG. 3, the biasing member 76 is arranged between the rotor member 64 and the valve shaft 70 (more specifically, a step portion of the valve shaft 70).

The biasing member 76 has a function of biasing the valve shaft 70 in the downward direction, and pressing the valve body 75 against the valve seat 14 when the valve body 75 seats on the valve seat 14. In addition, the biasing member 76 has a function of biasing the rotor member 64 in the upward direction, bringing the rotor member 64 and the valve shaft 70 into pressure contact with each other, and making the movement of the valve shaft 70 follow the movement of the rotor member 64.

In the example described in FIG. 3, the valve shaft 70 moves in an axial direction. More specifically, the control valve 1 is a poppet valve of a type that the valve body 75 moves in a vertical direction to a seat surface of the valve seat. Alternatively, the control valve 1 may be the other valve than the poppet valve, for example, a ball valve or a butterfly valve.

(Piping Parts)

Figure 5:
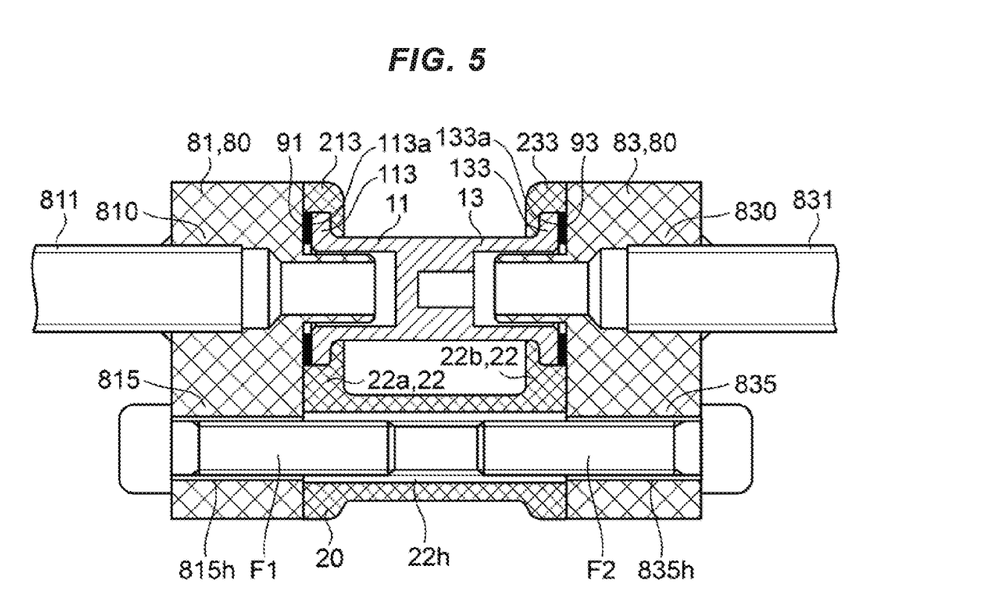
FIG. 5 is a schematic cross sectional view showing an example of a connection structure between a connection member and piping parts.

A description will be given of an example of the piping part 80 connected to the fastening portion 22 of the connection member 20 with reference to FIG. 5. FIG. 5 is a schematic cross sectional view showing an example of a connection structure between the connection member 20 and the piping part 80.

In the example described in FIG. 5, the piping part 80 is provided with a first piping part 81 which is connected to the fastening portion 22 (the first fastening portion 22a).

The first piping part 81 is provided with a piping connection portion 810 in which a first connection pipe 811 is arranged, and a piping part side fastening portion 815 which is fastened to the fastening portion 22 (the first fastening portion 22a).

A flow path within the first connection pipe 811 communicates with a flow path within the first piping 11. In the example described in FIG. 5, a surface of the piping connection portion 810 and a surface of the first flange receiving portion 213 are in contact with each other. Further, a first seal member 91 (an O-ring) is arranged in a space which is formed by the piping connection portion 810 and the first flange receiving portion 213, and the first piping 11. The first seal member 91 is sandwiched by the piping connection portion 810 and the first receiving surface 113a of the first flange portion 113.

In the example described in FIG. 5, a hole portion 815h is formed in the piping part side fastening portion 815, the hole portion 815h into which the fastening member F1 such as the bolt or the screw is inserted.

In the example described in FIG. 5, the piping part 80 is provided with a second piping part 83 which is connected to the fastening portion 22 (the second fastening portion 22b).

The second piping part 83 is provided with a piping connection portion 830 in which the second connection pipe 831 is arranged, and a piping part side fastening portion 835 which is fastened to the fastening portion 22 (the second fastening portion 22b).

A flow path within the second connection pipe 831 communicates with a flow path within the second piping 13. In the example described in FIG. 5, a surface of the piping connection portion 830 and a surface of the second flange receiving portion 233 are in contact with each other. Further, a second seal member 93 (an O-ring) is arranged in a space which is formed by the piping connection portion 830 and the second flange receiving portion 233, and the second piping 13. The second seal member 93 is sandwiched by the piping connection portion 830 and the second receiving surface 133a of the second flange portion 133.

In the example described in FIG. 5, a hole portion 835h is formed in the piping part side fastening portion 835, the hole portion 835h into which the fastening member F2 such as the bolt or the screw is inserted.

The piping part 80 is made of, for example, the metal. In the example described in FIG. 5, the piping part 80 is a block-shaped block part, however, the piping part 80 may be a piping itself (for example, the first connection pipe 811 or the second connection pipe 831).

(Method of Manufacturing Control Valve in Embodiment)

Figure 6:
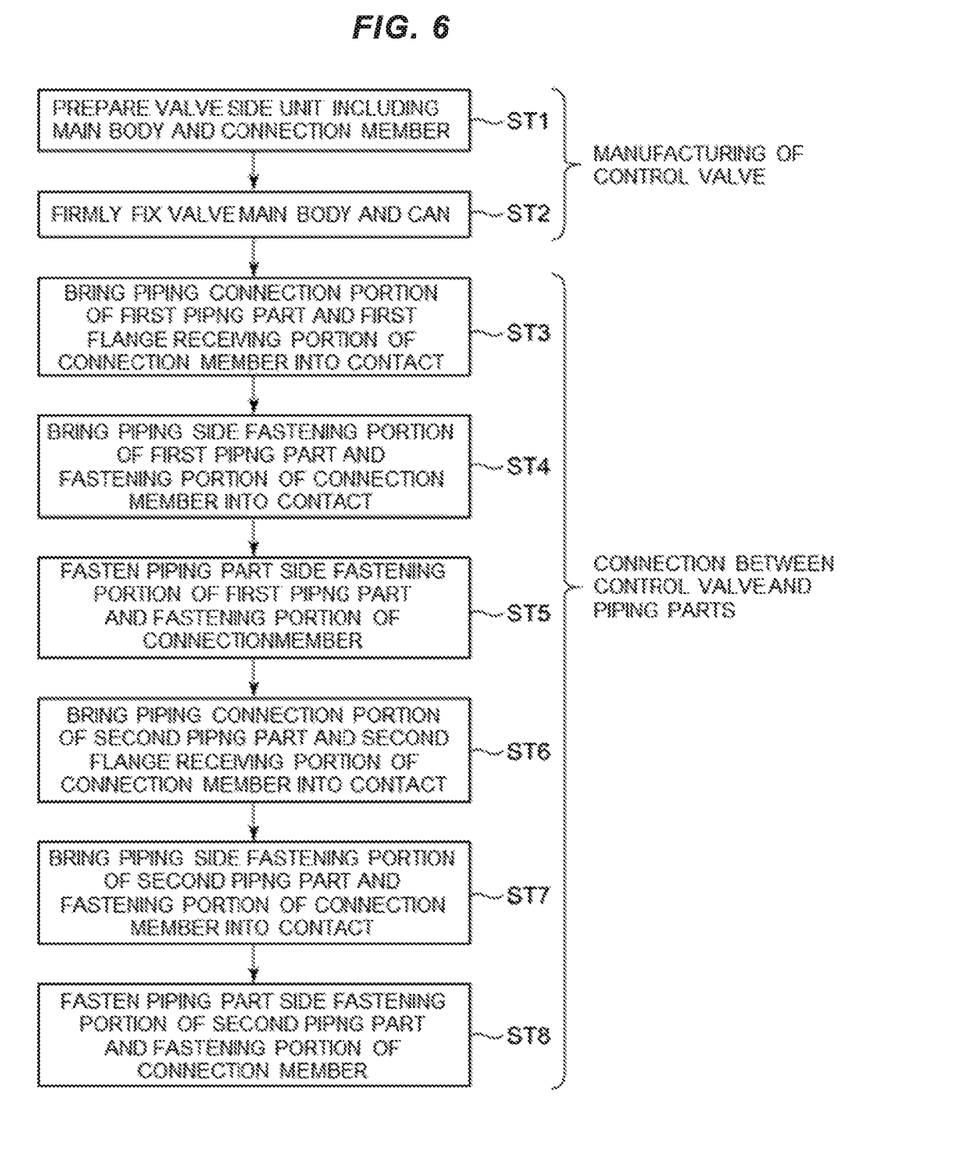
FIG. 6 is a flow chart showing an example of a method of manufacturing the control valve.

A description will be given of an example of a method of manufacturing a control valve according to an embodiment with reference to FIG. 6. FIG. 6 is a flow chart showing an example of the method of manufacturing the control valve.

In a first step ST1, there is prepared the valve side unit 2 which includes the valve main body 10 made of the metal, and the connection member 20 made of the resin. For example, first of all, the valve main body 10 having the valve chamber VS is inserted into the molding die. Further, secondly, the resin material is cast into the molding die. As mentioned above, the valve side unit 2 including the valve main body 10 made of the metal and the connection member 20 made of the resin is insert molded.

The connection member included in the valve side unit 2 manufactured according to the first step ST1 is provided with the fastening portion 22 for connecting the piping part 80.

In a step ST2, the valve main body 10 made of the metal is firmly fixed to the can 30 made of the metal directly. For example, the valve main body 10 and the can 30 are firmly fixed directly by welding the valve main body 10 and the can 30.

In the step ST2, the valve drive portion such as the rotor member 64 may be accommodated in the inner portion of the can 30 which is connected to the valve main body 10. In the case that the control valve 1 is the electromagnetic valve, the valve drive portion is a plunger (for example, an armature) and an energy applying portion is a solenoid (a coil).

A step of firmly fixing the guide unit guiding the movement of the valve shaft 70 to the valve main body 10 may be executed between the first step ST1 and the second step ST2. The step of firmly fixing the guide unit 50 to the valve main body 10 is executed, for example, by threadably mounting the guide unit 50 to the first connection portion 16 of the valve main body 10. In this case, a seal member such as an O-ring may be arranged between the guide unit 50 and the valve main body 10.

As mentioned above, according to the embodiment, the control valve 1 can be easily manufactured without requirement of any complicated work.

(Connection Between Control Valve 1 and Piping Part 80)

A description will be given of an example of a method of connecting the control valve 1 and the piping part 80 with reference to FIG. 6.

In a third step ST3, the piping connection portion 810 and the first flange receiving portion 213 of the connection member 20 are brought into contact with each other, in a state in which the piping connection portion 810 of the first piping part 81 is aligned with the first piping 11 of the valve main body 10. At this time, the first seal member 91 may be arranged between the piping connection portion 810 and the first piping 11.

In a fourth step ST4, the piping part side fastening portion 815 of the first piping part 81 and the fastening portion 22 of the connection member 20 are brought into contact with each other. The fourth step ST4 may be executed before the third step ST3, or may be executed after the third step ST3, or may be executed at the same time as the third step ST3.

In a fifth step ST5, the piping part side fastening portion 815 of the first piping part 81 is fastened to the fastening portion 22 of the connection member 20. The piping part side fastening portion 815 may be fastened to the fastening portion 22 by inserting the fastening member F1 into the hole portion 815h of the piping part side fastening portion 815 and the hole portion 22h of the fastening portion 22.

In a sixth step ST6, the piping connection portion 830 and the second flange receiving portion 233 of the connection member 20 are brought into contact with each other in a state in which the piping connection portion 830 of the second piping part 83 is aligned with the second piping 13 of the valve main body 10. At this time, the second seal member 93 may be arranged between the piping connection portion 830 and the second piping 13.

In a seventh step ST7, the piping part side fastening portion 835 of the second piping part 83 and the fastening portion 22 of the connection member 20 are brought into contact with each other. The seventh step ST7 may be executed before the sixth step ST6, or may be executed after the sixth step ST6, or may be executed at the same time as the sixth step ST6.

In an eighth step ST8, the piping part side fastening portion 835 of the second piping part 83 is fastened to the fastening portion 22 of the connection member 20. The piping part side fastening portion 835 is fastened to the fastening portion 22 by inserting the fastening member F2 into the hole portion 835h of the piping part side fastening portion 835 and the hole portion 22h of the fastening portion 22.

As mentioned above, in the embodiment, the control valve 1 can be easily connected to the piping parts without requirement of any complicated work.

The present invention is not limited to the embodiments mentioned above. Further, any given constituent elements of the embodiments can be modified or any given constituent elements can be omitted in each of the embodiments, within the scope of the present invention.

REFERENCE SIGNS LIST

1: control valve
2: valve side unit
3: drive unit
4: housing
10: valve main body
11: first piping
13: second piping
14: valve seat
15: partition wall
16: first connection portion
20: connection member
22: fastening portion
22-1: first end surface
22-2: second end surface
22a: first fastening portion
22b: second fastening portion
22c: female thread portion
22h: hole portion
30: can
30a: lower end portion
32: side wall
34: end wall
50: guide unit
50c: second thread portion
58: stopper
62: stator member
64: rotor member
70: valve shaft
70a: first end portion
70b: second end portion
75: valve body
76: biasing member
80: piping part
81: first piping part
83: second piping part
91: first seal member
93: second seal member
113: first flange portion
113a: first receiving surface
133: second flange portion
133a: second receiving surface
213: first flange receiving portion
213h: hole portion
233: second flange receiving portion
233h: hole portion
620: coil
622: bobbin
640: inner tube
640c: first thread portion
641: outer tube
643: connection member
646: positioning member
648: valve shaft support portion
810: piping connection portion
811: first connection pipe
815: piping part side fastening portion
815h: hole portion
830: piping connection portion
831: second connection pipe
835: piping part side fastening portion
835h: hole portion
F1: fastening member
F2: fastening member
FP1: first flow path
FP2: second flow path
VS: valve chamber

The invention claimed is:

1. A control valve comprising:
a valve main body in which a valve chamber is formed in its inner portion;
a connection member which is firmly fixed to the valve main body; and
a can which is firmly fixed by welding to the valve main body,
wherein the valve main body and the can include the same metal material,
wherein the connection member is made of a resin,
wherein the valve main body comprises a first piping having a first flange portion provided in a first direction, and a second piping having a second flange portion provided in a second direction which is opposite to the first direction;
wherein the connection member comprises a fastening portion, a first flange receiving portion firmly fixed in a periphery of the first flange portion, and a second flange receiving portion firmly fixed in a periphery of the second flange portion; and
wherein the fastening portion is connected to the first flange portion via the first flange receiving portion, and is connected to the second flange portion via the second flange receiving portion;
whereby the fastening portion is configured to connect piping parts.

2. The control valve according to claim 1, wherein the valve main body is made of a stainless steel, and
wherein the can is made of a stainless steel.

3. The control valve according to claim 1, wherein the valve main body and the connection member are integrated according to an insert molding.

4. The control valve according to claim 1, further comprising:
a rotor member which is arranged within the can; and
a stator member which is arranged outside the can.

* * * * *